Patented Jan. 20, 1953

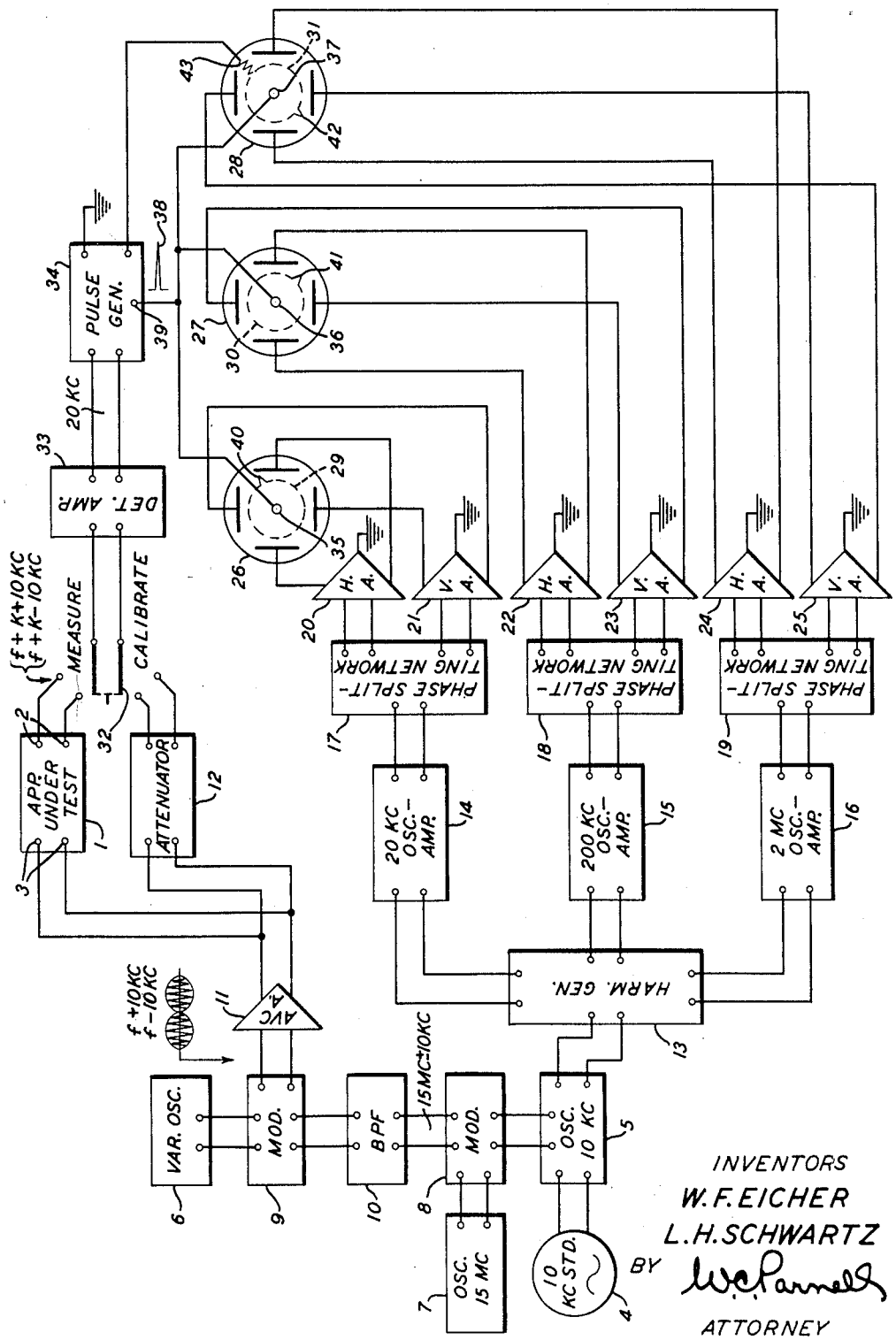

2,626,306

UNITED STATES PATENT OFFICE 2,626,306

TRANSMISSION DELAY MEASURING SYSTEM

William F. Eicher, Westfield, and Lyle H. Schwartz, Maplewood, N. J., assignors to Western Electric Company, Incorporated, New York, N. Y., a corporation of New York Application March 22, 1949, Serial No. 82,846

5 Claims. (Cl. 175—183)

This invention relates to the measurement of delay in the transmission of signal currents.

In various types of signal transmitting systems wherein the signals consist of components of different frequencies, it is important that transmission medium be such that components in the received signal are in the same relative phase relations as in the original signal wave. To avoid distortion, the delay in transmission must be the same for all frequencies, or in other words, any phase shift produced in the signal by the transmitting medium must be directly proportional to frequency. This is particularly true in television systems since, for example, a delay distortion of even one millionth of a second produces on a 10" television receiver screen a shift of about $\frac{3}{16}$", which obviously results in excessive blurring of the image. In television transmitting and receiving terminal equipment, delay distortion therefore must be kept at a very low value and this very severe requirement greatly complicates the testing of such equipment.

When the apparatus to be tested for transmission delay is of relatively simple construction and a suitable standard apparatus is available, such tests are often made by the well-known comparison method, but in the case of complex equipment, such as television terminals which must be tested to extremely close limits, no calibrated standard apparatus is available, and even if it were, it necessarily would be very complex and expensive and its calibration would require frequent checking to insure reliable results. When any method other than the comparison method is used to test television terminals, the procedure is further complicated by the fact that the input and output frequencies of the terminals differ in frequency, as for example by 311 kc. per second.

The object of this invention is a method and apparatus for testing transmission delay to a very high degree of accuracy independently of any physical standard and independently of any frequency shift produced by the circuits used in connection with the apparatus under test.

According to the general features of the invention, this object is attained by measuring only the relative delay at different frequencies and indicating this delay on a time base controlled from a frequency source of the required degree of accuracy. This time base is embodied in a decade system of oscilloscopes in which the oscilloscopes produce circular patterns sweeping at different frequencies under the control of the standard. The standard frequency also determines the frequency interval between upper and lower single frequency sidebands of the frequency of an adjustable frequency test oscillator. These sidebands are transmitted through the apparatus to be tested and detected to produce a single frequency equal to the difference or interval between the sideband frequencies and of a phase dependent on the relative phase of the sidebands, as affected by the apparatus under test. From this difference frequency sharp pulses are derived and used to produce marker pips on the oscilloscope patterns. From the positions of these marker pips the transmission delay is read directly on suitable time scales. These readings give the difference in the delays produced by the apparatus under test for signals of the two sideband frequencies. By adjusting the frequency of the test oscillator, the sidebands may be shifted to any desired positions in the frequency range of interest.

While this invention does not measure the absolute phase shift or absolute delay at any frequency, it does measure the deviation in transmission delay for any two signal components differing in frequency by the interval between the sidebands. The distortion due to transmission delay therefore may be kept within any desired limits by setting up test requirements on the basis of permissible deviation in delay between any two specified frequencies.

These and other features of the invention will be understood from the drawing and detailed description of a testing system shown by way of illustration in the single figure of the drawing.

In the drawing the apparatus 1 may be any apparatus which is to be tested for transmission delay. It may be a relatively simple, passive network or it may be a very complex system including amplifiers, modulators and other components, such that in use the frequencies at the output terminals 2 are different from the frequencies at the input terminals 3. In the case of television transmitting terminal equipment, the input frequencies are shifted upwardly in the frequency spectrum by e. g. 311 kc. for transmission and then restored to their original frequencies in the receiving equipment.

Available standard frequency accurate to one part in one hundred million is supplied from a source 4 to lock in a local oscillator 5, operating in this case at 10 kc., to provide, in a manner to be described, 10 kc. sidebands of the test frequency. Assuming that the equipment 1 is to be tested over a frequency range extending from 50 kc. to 3.5 mc. per second, the variable oscillator 6 may have an operating range of 11.45 mc. to 14.95 mc. and the fixed frequency oscillator 7 may generate a frequency of 15 mc. per second. Controlled 10 kc. currents from the oscillator 5 and 15 mc. currents from the oscillator 7 are modulated in a modulator 8 to supply to the modulator 9, through a band pass filter 10, sideband frequencies of 15 mc. ± 10 kc. as indicated. The oscillator 6 is of the heterodyne type having a frequency adjusting dial calibrated, not in terms of the frequency oscillator 6, but in terms of the difference "$f$" between its frequency and that of oscillator 7. With the output of oscillator 6 also supplied to the modulator 9 and this device operating in a well-known manner to suppress the carrier frequency (which in this case is the dial setting of oscillator 6), the input supplied to the amplifier 11 will comprise only two significant frequencies, namely, "$f$" + 10 kc. and "$f$" − 10 kc. The amplifier is a conventional automatic volume controlling device for regulating the amplitude of these frequencies and supplying them at constant level to the apparatus 1 and the attenuator 12.

The locked-in oscillator 5 also supplies 10 kc. current to conventional harmonic generating apparatus 13 which generates currents of the harmonic frequencies 20 kc., 200 kc. and 2 mc. These harmonic frequencies are supplied to and used to lock in oscillator-amplifiers 14, 15 and 16, respectively, which in turn supply currents of these harmonic frequencies at suitable levels to conventional phase splitting networks 17, 18 and 19, respectively. The outputs of these networks, each comprising two currents of the same harmonic frequency but displaced from each other in phase by 90°, are supplied to amplifiers 20 to 25 which have output circuits balanced with respect to ground and connected to the corresponding horizontal and vertical deflector plates of three oscilloscope tubes 26, 27 and 28. As is well understood in the art, these split phase voltages on the deflector plates will produce on the screens of the tubes circular patterns 29, 30 and 31, rotating at the frequencies of the harmonics; that is to say, the pattern 29 will rotate 20,000 times per second or one revolution in 50 microseconds and patterns 30 and 31 will make one revolution in 5 microseconds and 0.5 microsecond, respectively.

The test frequencies from modulator 9 are transmitted through either the apparatus 1 or the attenuator 12, according to the position of a switch 32, to an envelope detector-amplifier 33 which delivers to a pulse generator 34 currents of a frequency equal to the difference between the test frequencies, in this case 20 kc. per second. It will be noted that the operation of the switch 32 to connect in the apparatus 1 does not change the input frequency to the pulse generator, since the apparatus under test increases each test frequency by the same amount "$k$" (usually 311 kc. per second), and this frequency shift therefore does not change the envelope frequency which is the numerical difference between the test frequencies.

The pulse generator 34 may be of any known type which is capable of generating from each cycle of its 20 kc. sine wave input a single, very sharp pulse, which pulses are in constant phase relation to the corresponding sine waves. The oscilloscope tubes are of a known type having means, such as axially disposed electrodes 35, 36 and 37, to which potentials may be applied to produce radial deflections in the cathode beam. The pulses 38 from the output terminal 39 of the pulse generator, when applied to these electrodes, will therefore produce pips, such as 40, 41 and 42, on the oscilloscope patterns in radial positions corresponding exactly to the time relation of the pulse with respect to the test frequency from the modulator 9.

With the system energized to function in the manner described, the oscillator 6 is set to a desired frequency within the range of 50 kc. to 3.5 mc. per second. If, for example, the tuning dial is set on 50 kc., the amplifier 11 will receive currents of 40 kc. and 60 kc., but if the dial is set on 3.5 mc., the currents will be of the frequencies 3490 and 3510 kc. The switch 32 is closed downwardly to connect the attenuator into the circuit and since this device is purely resistive, it introduces no delay in transmission and the pips appear at particular positions on the several oscilloscope screens as determined by the transmission delay introduced by the various components of the testing system. The oscilloscopes are preferably provided with suitable time scales which may be indexed to the positions of the pips so that the delay introduced by the apparatus under test may be read directly from these index marks.

The switch 32 is then operated to substitute the apparatus 1 for the attenuator, so that the test frequencies are transmitted through the apparatus and the pips appear on the oscilloscope screens at other positions depending on the time delay introduced by the apparatus. Any shift in the positions of the pips from their previously indexed positions is due solely to the characteristic of the apparatus since all other delays produced in the system have been taken into account in setting the indexes of the time scales. For the particular system shown, any differences up to 50 microseconds in the times of transmission of the two test frequencies can be easily read to the nearest 5 microseconds on the scale of the tube 26. This time can be further fixed to the nearest half microsecond by observing the scale on the tube 27 and to the nearest one hundredth of a microsecond by observing the scale of tube 28.

Since the pulses are produced at the rate of 20,000 per second and the pattern 31 of tube 28 rotates 100 revolutions for each pulse, the intensity of the pips produced on this pattern ordinarily would be too low for proper observation. It therefore is advantageous following an expedient often used in the oscilloscope art to supply from the pulse generator to the intensity grid 43 of at least the tube 28 a portion of the pulse potential to increase the intensity of the trace while the pulse potential is being applied to the electrode 37 so that the pip 42 will compare in brilliancy with that of the circular pattern 31.

It should be noted that as the envelope frequency supplied by the modulator 9 is independent of the frequency of oscillator 6, it is not necessary to lock in this oscillator to the standard frequency. Also, for the purposes of the particular system described, the available standard frequency is of a much higher degree of accuracy than actually required. Insofar as the accuracy of the time base is concerned, additional decade oscilloscope can be added for determining the transmission delay to much smaller parts of a microsecond than can be read from the tube 28.

Conversely, when the half microsecond scale of tube 28 provides the required accuracy, the standard frequency source 4 may have a considerably lower order of stability without affecting the accuracy of measurement.

Obviously, as desired, the time scales described may be adapted to cover any other range of delay times by proper choice of other harmonic frequencies for producing the circular oscilloscope patterns, and a corresponding envelope frequency for producing the pips. In any case, by providing a suitable number of decade steps in the oscilloscope system, the delay may be read to an accuracy limited only by the accuracy of the standard frequency source.

In other types of delay measuring systems, frequent tests must be made to avoid errors in measurement due to some instability of the system. In the system of the present invention, all such errors are automatically balanced out since all components in which instability may arise are common to the indexing and measuring circuits, and the accuracy of measurement is assured as long as the various oscillators remain in synchronism with the controlling standard frequency. No measurement error due to loss of synchronism can occur however for any deviation from its proper value in the frequency of one of the oscillators will cause rotation of one or more of the pips on the oscilloscope scales, making it impossible to take a delay reading.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of measuring the differences between the propagation times through apparatus to be tested of two currents of different test frequencies, which comprises producing two test frequencies having a difference frequency controlled by a standard frequency source, producing a time scale moving in synchronism with the source, producing a stationary index mark on the scale at a position corresponding to the relative phase of the test frequencies transmitted over a signal path, connecting the apparatus to be tested serially in the path and producing a second stationary mark on the scale in a position corresponding to the relative phase of the test frequencies after transmission over the path including the apparatus.

2. The method of checking the phase-frequency transmission characteristic of electrical apparatus, which comprises generating two currents having a fixed difference frequency in controlled phase relation to a standard frequency, producing a time base rotating in fixed phase relation to the standard frequency, producing an index marker on the time base to indicate the relative phase of the two currents after transmission over a given path, connecting the apparatus to be checked into the path, producing a secondary marker on the base displaced from the position of the index marker to indicate the change produced by the apparatus in the relative phase of the two currents, then changing the frequencies of the two currents while maintaining the fixed difference frequency, producing other corresponding index and secondary markers on the base for each change in the frequencies and noting the time displacement of each secondary marker with respect to the corresponding index.

3. In apparatus for measuring the difference in transmission delay, produced by apparatus to be tested, in signal components of different frequencies, the combination with a source of signal components of different frequencies, a signal path including apparatus to be tested and a second path of known phase shift, each path having input terminals connected to the source and output terminals, means for generating single frequency currents equal in frequency to the difference between the frequencies of said components and of a phase depending on the relative phase of the signal components and means for selectively connecting said means to the output terminals of the paths, of means for sweeping a plurality of cathode beams at harmonic frequencies of the single frequency in stable phase relation to the signal components from the source, and means for generating pulse potentials for deflecting the cathode beams at times during the sweeps determined by the relative phase of the signal components.

4. In apparatus for measuring the difference in transmission delay produced by apparatus to be tested in signal components of different frequencies, a source of standard frequency, means for successively generating a series of pairs of test frequencies extending over the frequency range of the apparatus, the frequencies of all the pairs differing from each other by a constant frequency in locked-in relation to the standard frequency, means operating in locked-in relation to the standard frequency to generate a frequency equal to the constant difference frequency and at least one other harmonically related frequency, means for producing a plurality of time bases from said harmonically related frequencies and means for marking the time bases in accordance with the difference in the delays in the transmission through the apparatus to be tested of the two frequencies of each pair.

5. In a transmission delay measuring system, a source of standard frequency, a time base comprising a plurality of cathode ray oscilloscopes generating circular patterns rotating at different frequencies under the control of the standard frequency, a source of test currents comprising sideband frequencies of a variable carrier frequency, the sidebands differing in frequency by an interval controlled by the standard frequency, a detector having input and output circuits, means for selectively connecting the source of test currents to the input of the detector independently of or through apparatus to be tested, means for generating pulse potentials from the output of the detector and means for marking the oscilloscope patterns in accordance with the pulse potentials.

WILLIAM F. EICHER.
LYLE H. SCHWARTZ.

REFERENCES CITED

The following references are of record in the file of this patent:

UNITED STATES PATENTS

| Number | Name | Date |
|---|---|---|
| 2,175,001 | Sherman | Oct. 3, 1939 |
| 2,189,457 | Archer | Feb. 6, 1940 |
| 2,203,750 | Sherman | June 11, 1940 |
| 2,403,626 | Wolff et al. | July 9, 1946 |
| 2,422,386 | Anderson | June 17, 1947 |
| 2,453,587 | McCoy | Nov. 2, 1948 |